United States Patent [19]

Tellerman

[11] Patent Number: 4,958,332

[45] Date of Patent: Sep. 18, 1990

[54] DAMPING DEVICE FOR SONIC WAVEGUIDES

[75] Inventor: Jacob Tellerman, Bayside, N.Y.

[73] Assignee: MTS Systems Corporation, Eden Prairie, Minn.

[21] Appl. No.: 405,473

[22] Filed: Sep. 11, 1989

[51] Int. Cl.⁵ .............................................. H04R 15/00
[52] U.S. Cl. .............................. 367/140; 324/207.13; 333/148; 73/32 A
[58] Field of Search ................... 73/32 A; 324/207.11, 324/207.13, 207.21; 333/148; 367/140, 908, 168

[56] References Cited

U.S. PATENT DOCUMENTS

| | | | |
|---|---|---|---|
| 3,526,857 | 9/1970 | Dickinson | 333/148 |
| 3,898,555 | 8/1975 | Tellerman | 324/34 |
| 4,071,818 | 1/1978 | Krisst | 324/207.13 |
| 4,404,523 | 9/1983 | Hughes et al. | 324/207.13 |
| 4,654,590 | 3/1987 | Kitaura et al. | 324/207.13 |
| 4,721,902 | 1/1988 | Tellerman | 324/58.5 |
| 4,803,427 | 2/1989 | Mason et al. | 324/207.13 |

OTHER PUBLICATIONS

Drawing No. 20064 from Temposonics (a Division of MTS Systems Corporation), dated 9/86.

Primary Examiner—Charles T. Jordan
Assistant Examiner—J. Woodrow Eldred
Attorney, Agent, or Firm—Kinney & Lange

[57] ABSTRACT

A damping device for damping mechanical vibrations in a small diameter elongated member, such as a waveguide carrying torsional strain waves, includes a damping material contained inside a housing on the waveguide, the damping material is a viscous liquid that does not evaporate or change viscosity over a wide temperature range and which has additives for providing adequate mass density for damping vibrations in such elongated member. The use of a viscous liquid and additives for changing the mass density permits varying the mass density to match impedances and reduce the amplitudes of any reflective waves. The viscous liquid preferably comprises a silicone base oil partially filled with zinc oxide and metal particles to give the characteristic of stable viscosity across a wide range of temperature and provide the necessary attenuation while obtaining good coupling of the damping material to the elongated member.

12 Claims, 2 Drawing Sheets

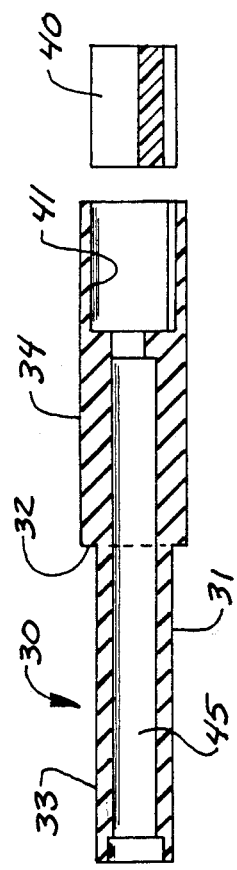
FIG. 3
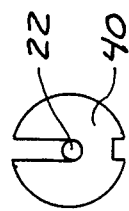
FIG. 4
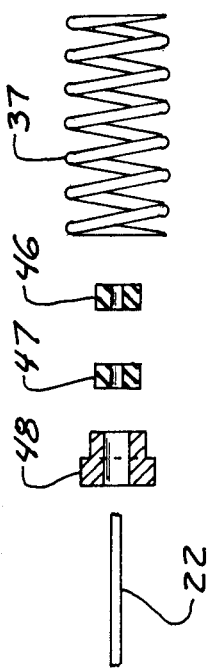

DAMPING DEVICE FOR SONIC WAVEGUIDES

BACKGROUND OF THE INVENTION

1. Field of the Invention.

The present invention relates to damping structures for elongated objects, such as the waveguides in magnetostrictive displacement or distance measuring transducers.

2. Description of the Prior Art.

The prior art discloses magnetostrictive transducers having elongated waveguides that carry torsional strain waves induced in the waveguide when current pulses applied along the waveguide pass through a magnetic field. A typical linear distance measuring device using a movable magnet that interacts with a waveguide when current pulses are provided along the waveguide is shown in U.S. Pat. No. 3,898,555. Damping devices for the waveguide are illustrated in this patent, to damp reflected waves at both the remote end of the waveguide, and also at the mounted end of the waveguide. These devices generally are soft rubber pads that are clamped about the waveguide to absorb sonic strain wave pulse energy to minimize reflections of the generated pulse and reduce interference of the reflections with the signals to be sensed.

The damp devices, and the arrangements for anchoring the waveguide at a remote end have taken up a substantial length at the remote end. Where liquid levels, for example, are being sensed by the transducer, it is desirable to have the waveguide operable and active as close to the bottom of the tank as possible, so minimizing the length of the waveguide support at its remote end, as well as the length of the damping device is important. Damping members made according to known prior art constructions require large lengths to operate satisfactorily.

The mass density of the damp material is quite important to provide a mechanical impedance such that the wave energy can be transferred into the damp device and then dissipated. The coupling from the waveguide to the damp must also be effective. The dissipation of the wave energy by the damping medium provides the damping, and therefore the damping material cannot be springy or resilient such as some elastomers, and must not spring back immediately as is the characteristics of some "gummy" type materials.

Silicone rubber dampers of two different durometers and/or different loading against the waveguide have been used. Lower pressure and durometers have been utilized to minimize front end reflection (input end) and then higher durometers with greater pressures clamping the dampers onto the waveguide were utilized to provide damping at the remote or termination end. Silicone rubber is at best a compromise as a damping medium because of its high resilience, which leads to the need for long damping sections. Silicone rubber does have good stability over a wide temperature range, which is an important benefit for damping materials.

Gum type damping mediums show good ability to attenuate vibration, or damp, but they harden at temperatures that are near the freezing point of water, and get extremely soft at temperatures well below 200° F. The same is true for epoxy or urethane elastomers, and such large changes in characteristics change the "front" end reflection and the "extreme" end reflection characteristics drastically with temperature.

The need for an effective damp material is especially evident when the transducer uses what is known as recirculation mode sensing. In the recirculation mode, each time the sensor receives a torsional strain signal, a current pulse is sent and this leads to a high mass density of pulses and a high build up of noise. While high resolution of the distance measurement results, if effective damping is not provided the "noise" build-up reduces the usefulness of the sensing technique.

Thus, ideally the damp material must be capable of being kept short, along with the end mounting structure for the waveguide, have good coupling to the waveguide itself, and must have the ability to dissipate energy.

SUMMARY OF THE INVENTION

The present invention relates to a remote end structure for an elongated member such as a waveguide used with a magnetostrictive displacement or distance measuring transducer, that adequately damps vibration and is short so the transducer can be active or effective close to a wall. The damping is done so as to prevent reflections of pulses that are transmitted along the waveguide. The damping device comprises a highly viscous, flowable material, that adheres to and couples to the waveguide, and which can have mass density changing additions, such as metallic powder, therein to vary the mass density along its length. The damping material is held against the waveguide with a suitable housing, and it can be loaded against the waveguide with pressure as selected. The damping material can be varied in mass density from the front end (input end) to the termination end. A variable mass density damp with a lighter material near the front end, to limit front end reflection and provide partial attenuation, and a more dense material near the back or termination end for completing attenuation, minimizes reflections in a short length of waveguide.

As disclosed, a pasty mixture that has a silicone oil base mixed with zinc oxide for a viscosity increase, and a powdered metallic material for increasing mass density, is held in place with a suitable outer housing or jacket. A positive pressure is provided between the paste damp material and the waveguide. The mixture of silicone oil and an oxide powder provides for good coupling of the damp material to a waveguide in a form of a paste, and the metal powder increases the mass density. A plurality of zones of mass density can be established inside the housing, and substantial damping can be obtained in a very short length.

The outer housing can be molded, and then clamped in place, after the paste material that is used for damping has been placed into an inner chamber where it will contact the waveguide, or it can be used in a slit tube with plugs at each end, which tube is filled with the damping material along its length between the plugs.

The damping medium comprises a liquid that does not evaporate or change viscosity to any substantial degree over a wide range of temperature, for example, in the range of minus 45° F. to 200° F. Silicone based oil provides the temperature stability feature. A solid medium metal oxide is used to increase the viscosity for improved energy absorption ability and to retain a constant viscosity over the wide temperature range. Zinc oxide, for example, has been found to serve this purpose well.

The metallic powder, which may be powdered copper, lead, zinc or the like, is used to increase the mass density of the paste while maintaining the viscous stability of the paste with time and temperature. The increased mass density tends to approach the acoustic impedance of the waveguide and therefore increases the damping of the strain wave in the shortest practical length. Different densities of material preferably can be used for obtaining the desired results, namely a lower mass density to reduce front end reflection and a high mass density to absorb terminal end reflections. The viscous damping material can be subjected to pressure to improve coupling to the waveguide as mass density is increased.

Additionally, the housing which carries the damping material can be provided with a waveguide anchor including a compression spring on the interior of an outer support tube acting against the damp housing to further minimize the length needed for the termination end of the waveguide, as well as for obtaining the desired damping.

BRIEF DESCRIPTION OF THE DRAWINGS

FIG. 3 is an exploded view of the damp material housing, and support structure shown in FIG. 2; and FIG. 4 is an end view of a waveguide support plug showing a waveguide in position.

DETAILED DESCRIPTION OF THE PREFERRED EMBODIMENT

Figure 1:
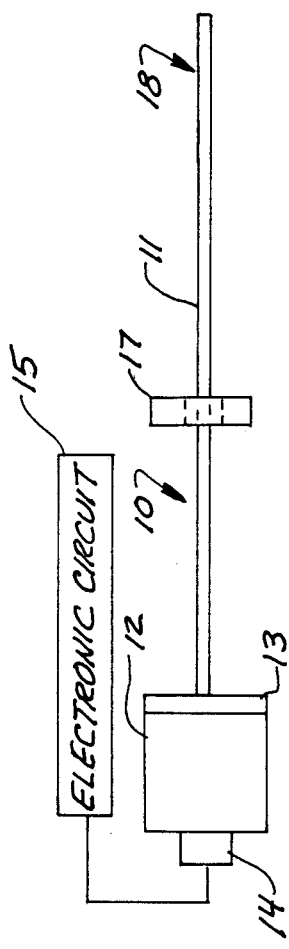
FIG. 1 is a schematic representation of a typical transducer having a waveguide with a remote end damping device and waveguide support system made according to the present invention.

In FIG. 1, a transducer indicated at 10 is of the same type as shown in U.S. Pat. No. 3,898,555, for measuring displacements and/or distances. The transducer 10 includes an elongated waveguide assembly 11, that is supported in a housing 12 through an end flange 13. The waveguide assembly 11 includes an outer support tube and an interior waveguide through which a current is passed, which provides a field passing through the waveguide. A magnet 17 is mounted over the waveguide assembly, and the magnet 17 when the circumferential field of the current pulse interacts with it torsional pulse is generated through the waveguide itself, and is sent back to the housing 12. A suitable mode converter provides an electrical signal through an electronic circuit 15. A plug or connector 14 connects the circuit 15 to the connector 14 to provide an output indicating the spacing of the magnet 17 from the mode converter in the housing 12.

The remote end portion 18 of the waveguide assembly 11 is normally the end which would be at the bottom of a tank, if the magnet 17 is being used for determining the level of liquid in the tank. It is desired to make the dead zone or non-signal producing zone at the remote end section 18 as short as possible, and yet accomplish the purposes of damping the waveguide to prevent reflected waves from interfering with the desired torsional wave signals. In prior art devices, the length of waveguide assembly that was needed for damping without substantial reflection tended to create a longer dead zone of the waveguide at the remote end, which in turn meant a deeper depth in the tank that could not be measured. Signals cannot be produced from the magnet position between the front or input end of the damping device to the remote end of the waveguide assembly.

Additionally, the waveguide is preferably maintained under tension during use, and generally a tension spring has been used at the outer end of the protective tube that engages the outer end of the waveguide and places it under tension load. Tension springs and the coupling links take substantial space, and the present device shortens up the dead zone by utilizing a unique arrangement providing a compression spring loading to maintain a tension in the waveguide.

Figure 2:
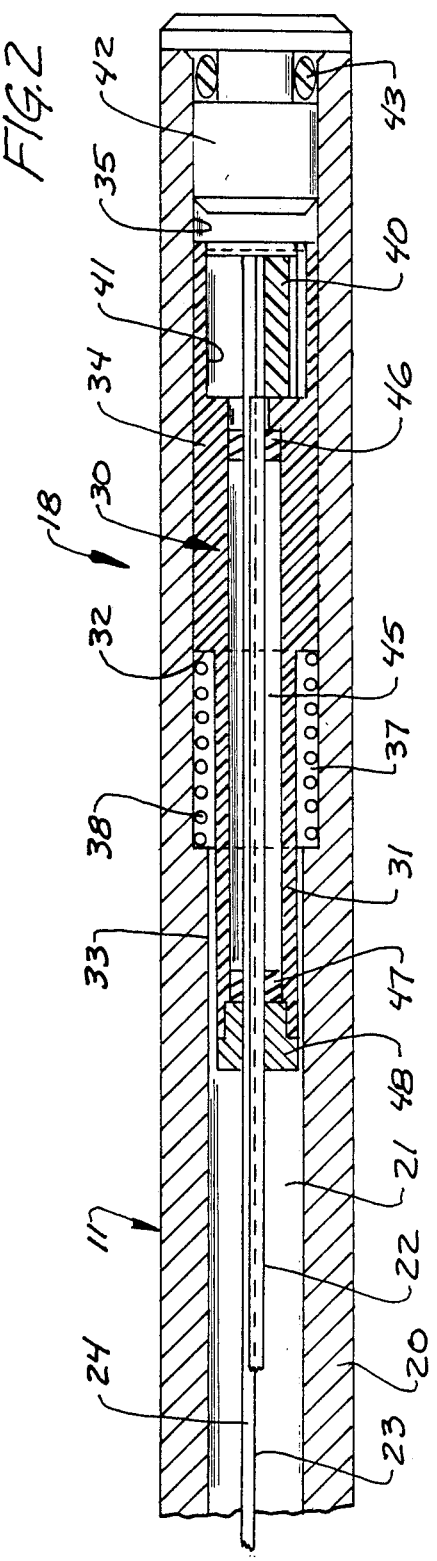
FIG. 2 is an enlarged vertical sectional view of the outer or remote end of the waveguide assembly shown in FIG. 1.

Referring to FIG. 2, the waveguide assembly indicated generally at 11 has an outer protective tube 20, and the section of tube 20 at the remote end 18 is illustrated in FIG. 2. The outer tube 20 has an interior passageway 21 through which a waveguide 22 passes. The waveguide, as shown, is a small diameter tube having an internal wire 23 extending through the center, as shown in U.S. Pat. No. 3,898,555, for providing pulses of current to be transmitted along the length of the waveguide. The magnet 17 will cause torsional strain waves to be introduced into the tube at the magnet location, and when sensed in relation to time elapsed from launch of a current pulse will indicate the distance of the magnet 17 from the mode converter in the head 12. A return wire 24 is also shown, for carrying electrical current. The return wire 24 merely is extended out through the end of the tubular portion of the waveguide at the remote end and passed back through the interior bore 21.

A waveguide support and damping device is indicated generally at 30, and comprises a housing 31 that is essentially tubular in form. The housing has a shoulder 32 formed on the outer surface thereof to form a housing section 33 which has a smaller outside diameter than most of the remote housing section 34. The larger diameter section 34 slidably fits within a counterbore portion 35 of the tube 20. A compression spring 37 is mounted against a shoulder surface 38 formed by the counterbore 35 relative to the bore 21, and the compression spring 37 also engages the shoulder 32 formed on the exterior of the housing 31. The waveguide 22 passes into a remote end waveguide anchor 40, which is also shown in end view in FIG. 4. Anchor 40 then holds the waveguide end in the housing 31 so that tension loads can be applied to the waveguide through the anchor. The waveguide anchor 40 fits within a bore 41 at the remote end of the housing 31. A plug 42 is provided in the counterbore 35 of the support tube 20 for sealing the end of the support tube 20. An O ring 43 can be provided for not only providing a seal, but also for providing a friction fit for the end plug 42.

The housing 31 has an inner bore portion indicated at 45. This bore 45 houses the waveguide 32 and the return wire 24, and forms a chamber for receiving a damp material. Suitable spacers 46 and 47 are provided at the opposite ends of the chamber formed by bore 45, and the spacers will prevent material from leaking out through the passageways for the waveguide at the ends of the bore. The spacer 47 also preferable is a soft rubber to reduce front end reflections. An end cap 48 is provided at the front or input end of the housing 31 the cap provides a support against which the spacer 47 will fit.

The chamber 45 is filled with a damping material. The damping material is a paste-type material that has the ability to maintain a substantially uniform viscosity across a wide range of temperatures, and which can have mass density enhancing particles added to it. Preferably, the material is a silicone oil base material, that has a filling of a suitable viscosity increasing powder, such as the zinc oxide powder, and then further a mass density increaser such as an addition of metal particles. The mass density can be varied along the entire length of the chamber 45, but specifically, a heavier paste generally will be put in near the remote or termination end, with a lighter paste or lighter damping material near the front or input end of the damping device, in order to minimize reflections.

Pasty, viscous and temperature stable materials that are suitable are available from Dow Corning, and their number 340 Silicone Heat Sink Compound is satisfactory. The following constituents from a satisfactory medium high mass density damping medium and a low mass density damping respectively:

| High Mass density | 2½ grams #200 silicone oil |
| | 4½ grams zinc oxide powder |
| | 33 grams copper powder |
| Low Mass density | 3½ grams #200 silicone oil |
| | 6½ grams zinc oxide powder |
| | 28 grams copper powder |

If the high mass density, highly viscous material is difficult to install, it can be liquified to a certain extent by using liquid freon solvent. Once installed the freon evaporates quickly and leaves the required consistency of the damping medium paste in position.

The addition of metallic powders is done as described, to permit changing the mass density across a wide range of densities this permits the selection of a wide range of damping action. Copper, lead, or zinc particles can be used for mass density enhancers.

Greater than atmosphere pressure on the paste material can be used if desired to increase the coupling between the waveguide and the damping medium or material. Such pressure can be accomplished by providing a band on the outside of the housing that squeezes the housing down. A damp medium housing for use with a compression spring mounting is illustrated, but a simple tubular rubber sleeve that has ends that will close to form a central chamber can be used as well. The rubber sleeve should be fairly soft to prevent reflections at the ends of the tube, and then the damping medium used is placed in the tube interior for dissipating the energy.

The housing 31 can be molded of nylon and have soft rubber inserts, such as spacers 46 and 47, supporting the waveguide to reduce front end reflections. The paste damping material is effective for damping in a short length. For example, the length of chamber 45 can be in the range of one inch. The compression spring arrangement help to shorten any dead zone in that the damp device also becomes a part of the anchor for the waveguide. The arrangement shown eliminates links and other anchors needed for tension springs which add to the length of the unit.

Although the present invention has been described with reference to preferred embodiments, workers skilled in the art will recognize that changes may be made in form and detail without departing from the spirit and scope of the invention.

What is claimed is:

1. A damping device for a vibrating elongated member comprising a housing having an interior chamber, said elongated member comprising a magnetostrictive waveguide having vibrations induced therein, means mounting said housing on said elongated member with the interior chamber open to the elongated member, and a filling of viscous material in said interior chamber having a desired mass density and coupled to the elongated member for absorbing energy of vibrations of said elongated member within said chamber.

2. The damping device of claim 1 wherein the mass density of the viscous material in the interior chamber increases in direction away from the source of the vibration acting on the device.

3. The damping device of claim 1 wherein said damping material in said interior chamber comprises a silicone oil base liquid having viscosity increasing additive therein.

4. The damping device of claim 3 wherein said viscosity increasing additive comprises zinc oxide.

5. The damping device of claim 4 wherein there are mass density increasing additives in said silicone oil base comprising metal particles intermixed in the silicone oil base.

6. The damping device of claim wherein said waveguide is supported in an outer tubular housing, said first mentioned housing having a shoulder thereon facing toward a remote end thereof, said outer tubular housing having a shoulder defined in the interior thereof that faces the shoulder on said first mentioned housing, and a compression spring between said shoulders, said waveguide being anchored to said first mentioned housing, whereby tension is applied to said waveguide by said compression spring.

7. The damping device of claim 6 wherein said first mentioned housing is slidably mounted within said outer tubular housing.

8. The damping device according to claim 1 wherein said viscous material comprises a viscous liquid having a viscosity increaser additive, and having mass density increasing additives therein, to cause at least two different densities of viscous material in direction along the waveguide.

9. A waveguide assembly having a remote end and including an outer protective tube, and an inner waveguide within the protective tube, means at the remote end of the waveguide for retaining the waveguide, said means to retain being slidably mounted within said protective tube, said means to retain comprising a housing surrounding portions of said waveguide, the portions surrounding the waveguide forming a chamber having a viscous damping liquid therein, said housing having a first spring support thereon, said protective tube having a second spring support spaced from the first spring support, and positioned inwardly farther from the remote end than the first spring support, and a compression spring between the first and second spring supports for tending to urge the housing outwardly toward the remote end to place tension in said waveguide.

10. The assembly of claim 9, wherein said housing has a shoulder thereon forming the first spring support, said shoulder facing the second spring support, and said compression spring surrounding at least a portion of said housing.

11. The apparatus of claim 10 wherein said chamber in said housing surrounds said waveguide, soft low durometer rubber means engaging said waveguide at an input end of said chamber that is spaced from the remote end, the viscous damping liquid in said chamber having a silicone oil base and additives to cause an increase in mass density of the viscous liquid over the viscosity of silicone oil.

12. The apparatus as specified in claim 11 wherein said silicone oil base has a zinc oxide additive therein for increasing viscosity.

* * * * *

UNITED STATES PATENT AND TRADEMARK OFFICE
CERTIFICATE OF CORRECTION

PATENT NO. : 4,958,332
DATED : September 18, 1990
INVENTOR(S) : Jacob Tellerman

It is certified that error appears in the above-identified patent and that said Letters Patent is hereby corrected as shown below:

Col. 6, line 18, delete "claim", insert --claim 1--.

Signed and Sealed this

Tenth Day of December, 1991

Attest:

HARRY F. MANBECK, JR.

*Attesting Officer*　　　*Commissioner of Patents and Trademarks*